US011364900B2

(12) United States Patent
Bauer et al.

(10) Patent No.: US 11,364,900 B2
(45) Date of Patent: Jun. 21, 2022

(54) LANE CHANGE ASSISTANCE SYSTEM

(71) Applicant: Ford Global Technologies, LLC, Dearborn, MI (US)

(72) Inventors: Franziskus Bauer, Huerth (DE); Andreas Stahl, Cologne (DE); Christian Marquardt, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 16/668,987

(22) Filed: Oct. 30, 2019

(65) Prior Publication Data
US 2020/0164871 A1    May 28, 2020

(30) Foreign Application Priority Data

Nov. 23, 2018   (DE) .......................... 102018220127.7

(51) Int. Cl.
*B60W 30/09* (2012.01)
*B60W 30/18* (2012.01)
*G08G 1/16* (2006.01)
*B60W 50/14* (2020.01)
*G06V 20/58* (2022.01)

(52) U.S. Cl.
CPC ...... *B60W 30/09* (2013.01); *B60W 30/18163* (2013.01); *B60W 50/14* (2013.01); *G06V 20/584* (2022.01); *G08G 1/167* (2013.01); *B60W 2554/80* (2020.02)

(58) Field of Classification Search
CPC .................. B60W 30/09; B60W 30/18163
See application file for complete search history.

(56) References Cited

U.S. PATENT DOCUMENTS

| 11,242,051 | B1* | 2/2022 | Konrardy | B60W 10/04 |
| 2007/0080825 | A1* | 4/2007 | Shiller | B62D 15/029 |
| | | | | 340/903 |
| 2011/0098922 | A1* | 4/2011 | Ibrahim | B60W 50/10 |
| | | | | 701/532 |
| 2012/0283942 | A1* | 11/2012 | T'Siobbel | G01C 21/26 |
| | | | | 701/410 |
| 2014/0244105 | A1* | 8/2014 | Dariush | B60W 30/0956 |
| | | | | 701/36 |
| 2015/0166062 | A1* | 6/2015 | Johnson | B60W 10/20 |
| | | | | 701/41 |

(Continued)

*Primary Examiner* — Jess Whittington
(74) *Attorney, Agent, or Firm* — Frank Lollo; Eversheds Sutherland (US) LLP

(57) ABSTRACT

The invention relates to a lane change assistance system in a vehicle (21), wherein the lane change assistance system has a sensor arrangement for detecting the current surrounding area of the vehicle in each case and is designed to generate a warning signal and/or steering intervention when an imminent lane change by the vehicle is identified, depending on a second vehicle (25) being detected by the sensor arrangement in the vehicle's surrounding area. In this case the lane change assistance system is designed to suppress generation of the warning signal and/or the steering intervention based on map data (15), particularly when the change of lane by the vehicle is to a newly opening lane (23) of a multiple lane road (22) which is branching off (e.g. of a corresponding motorway exit) and the second vehicle is located in another lane (24) of the road (22) which is branching off.

5 Claims, 2 Drawing Sheets

(56) References Cited

U.S. PATENT DOCUMENTS

Figure 1:
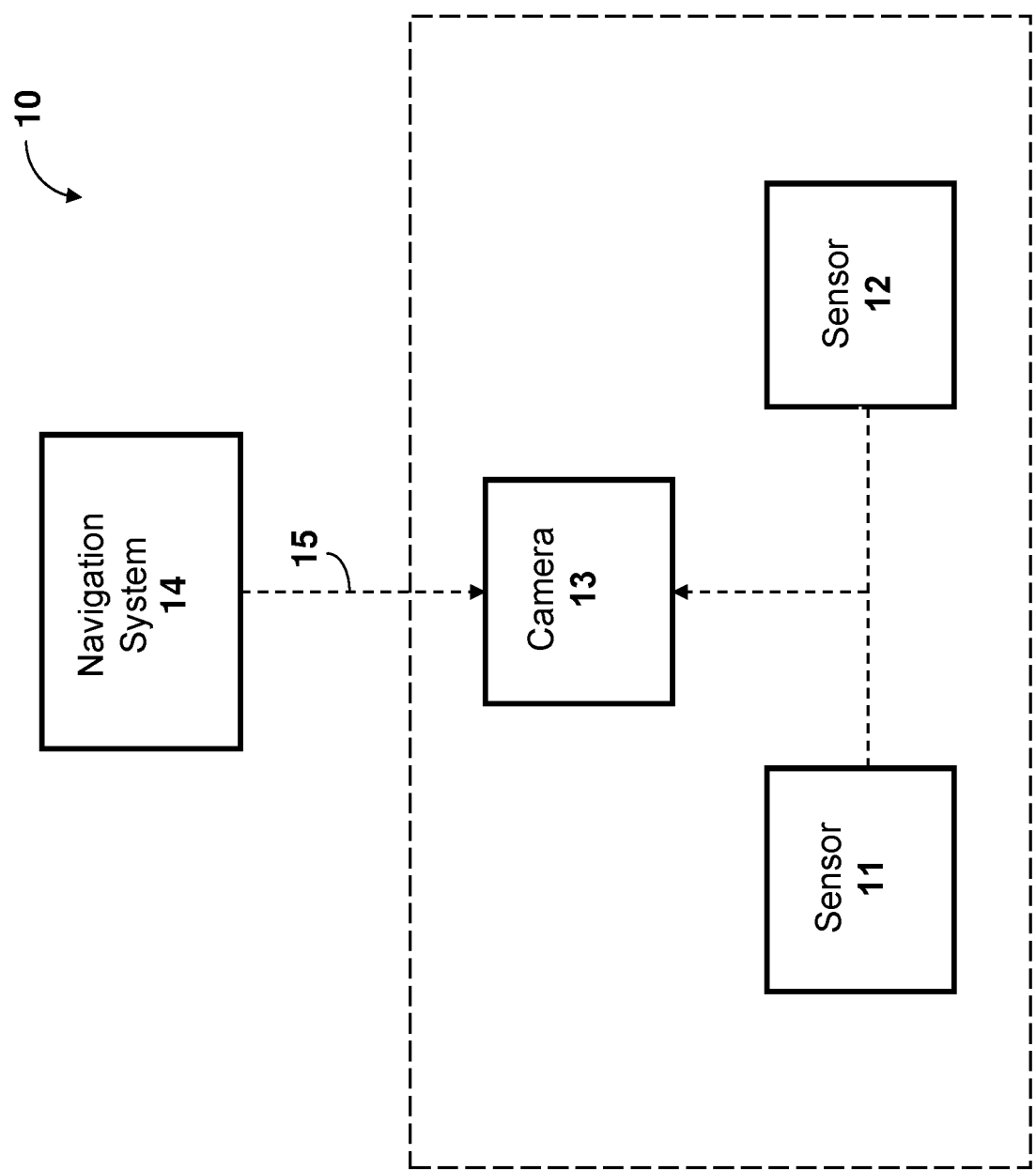

| | | | | |
|---|---|---|---|---|
| 2016/0314358 A1* | 10/2016 | Kushida | ............... | G06V 20/588 |
| 2017/0090478 A1* | 3/2017 | Blayvas | ............... | G07C 5/0808 |
| 2017/0232965 A1* | 8/2017 | Smith | ................... | B60W 50/10 |
| | | | | 701/93 |
| 2017/0352200 A1* | 12/2017 | Wang | ..................... | G08G 1/163 |
| 2019/0100202 A1* | 4/2019 | Jin | ..................... | B60W 30/182 |
| 2019/0315364 A1* | 10/2019 | Kim | ...................... | G05D 1/0061 |
| 2019/0367020 A1* | 12/2019 | Yan | ........................ | G06V 20/58 |
| 2020/0039511 A1* | 2/2020 | Ohmura | ................... | B62D 6/08 |
| 2020/0178043 A1* | 6/2020 | Cavalcanti | .............. | H04W 4/08 |
| 2021/0155242 A1* | 5/2021 | Taniguchi | ............ | B60W 30/10 |

\* cited by examiner

LANE CHANGE ASSISTANCE SYSTEM

CROSS-REFERENCE TO RELATED APPLICATIONS

This application claims priority to and the benefit of German patent application No. 102018220127.7, filed Nov. 23, 2018, which is hereby incorporated by reference herein in its entirety.

The invention relates to a lane change assistance system.

Modern motor vehicles are increasingly being fitted with lane change assistance systems (LCW=Lane Change Warning). Systems of this kind enable the driver to receive a collision-avoidance warning when initiating a lane change if a second vehicle is in the neighboring lane (e.g. within the so-called "blind spot"). If, in a corresponding scenario, a second vehicle of this kind is detected and, in addition, an immediately imminent lane change is detected, i.e. with the help of the indicator activation, a steering intervention similar to lane-keeping systems is automatically triggered in order to prevent the vehicle from changing lanes or at least a warning is given.

DE 10 2010 014 499 A1 discloses, among other things, a method for operating a lane-keeping system for multi-lane turning in a motor vehicle, wherein data on the surrounding area which describe the different turning lanes are identified and wherein, taking account of this data on the surrounding area, a virtual lane layout describing the lane driven along in the turning area is identified. The virtual lane layout is used for information and/or to assist a driver of the motor vehicle and is preferably shown using a head-up display within the driver's sight.

In practice, problems can occur in certain scenarios in that the warning signals or steering interventions described above are generated in circumstances where they are not justified. A scenario of this kind may exist, in particular, if the driver activates the indicator to leave a motorway, intending to turn into a newly opening second lane of a motorway exit. In this case, a second vehicle which may be located in the first (right-hand) lane of this motorway exit is identified as a collision risk and triggers a warning signal or steering intervention, without a collision actually being imminent, in view of the two lanes being available.

Against the above background, a problem addressed by the present invention is that of providing a lane change assistance system in which unnecessary warning signals or steering interventions are avoided and user comfort is enhanced accordingly.

This problem is solved according to the features of independent Patent claim 1.

The invention relates to a lane change assistance system in a vehicle, wherein the vehicle has a system for providing map data (e.g. a navigation system or a connection to a corresponding cloud storage device), wherein the lane change assistance system has a sensor arrangement for detecting the current surrounding area of the vehicle in each case and is designed to generate a warning signal and/or steering intervention when an imminent lane change by the vehicle is identified, depending on a second vehicle being detected by the sensor arrangement in the vehicle's surrounding area.

In this case, the lane change assistance system according to the invention is designed to suppress generation of the warning signal and/or the steering intervention based on map data supplied.

The invention is particularly based on the concept of using map data to determine whether a second vehicle detected with the help of sensors or cameras or by means of car-to-car communication (and located in the blind spot, for example) is situated in another separate lane (which therefore exists in addition to the turning lane selected by the vehicle itself). In other words, it is recognized according to the invention when the vehicle fitted with the inventive lane change assistance system turns into a newly opening lane of an at least two-lane road and does not therefore drive along or cross the (other) lane of the newly opening road already driven along by a second vehicle detected by sensors.

In this case, the generation of a warning signal and/or steering intervention is suppressed according to the invention, meaning that unwanted false activations of the lane change assistance systems are avoided and the user comfort is enhanced accordingly.

According to one embodiment, suppression of the warning signal and/or of the steering intervention takes place based on an evaluation as to whether during the imminent lane change the vehicle is switching to a lane which forms a newly opening lane which is in addition to the lane along which the second vehicle is driving. This newly opening lane may, in particular, be a lane of a motorway exit.

According to one embodiment, suppression of the warning signal and/or the steering intervention is based on an evaluation as to whether the second vehicle is located in a lane that will be driven along by the vehicle immediately after the imminent lane change.

According to one embodiment, the evaluation takes place with the help of map data supplied by a navigation system or a cloud storage device.

Alternatively, the map data may also be stored in the lane change assistance system itself, as only map information on turning lanes with a newly opening lane has to be stored and this only requires a small amount of storage space, even for a large geographical area, on account of the relative infrequency of situations such as this. It may also be provided that information of this kind stored in the lane change assistance system is routinely updated by an automatic comparison with the detailed map data of a navigation system or with the help of map data from a cloud storage device. It may also be provided that up-to-date road information, such as information on temporary roadworks, for example, is taken into account and, for example, if roadworks should be reported at the current position, the inventive feature is suppressed in relation to a possibly temporary change in lane guidance.

According to one embodiment, the evaluation takes place with the help of the position and/or orientation of the GPS and/or compass data describing the vehicle or with the help of other positioning systems.

Further embodiments of the invention can be inferred from the description and the dependent claims.

The invention is explained in greater detail below with the help of an exemplary embodiment depicted in the attached drawing.

Figure 2:
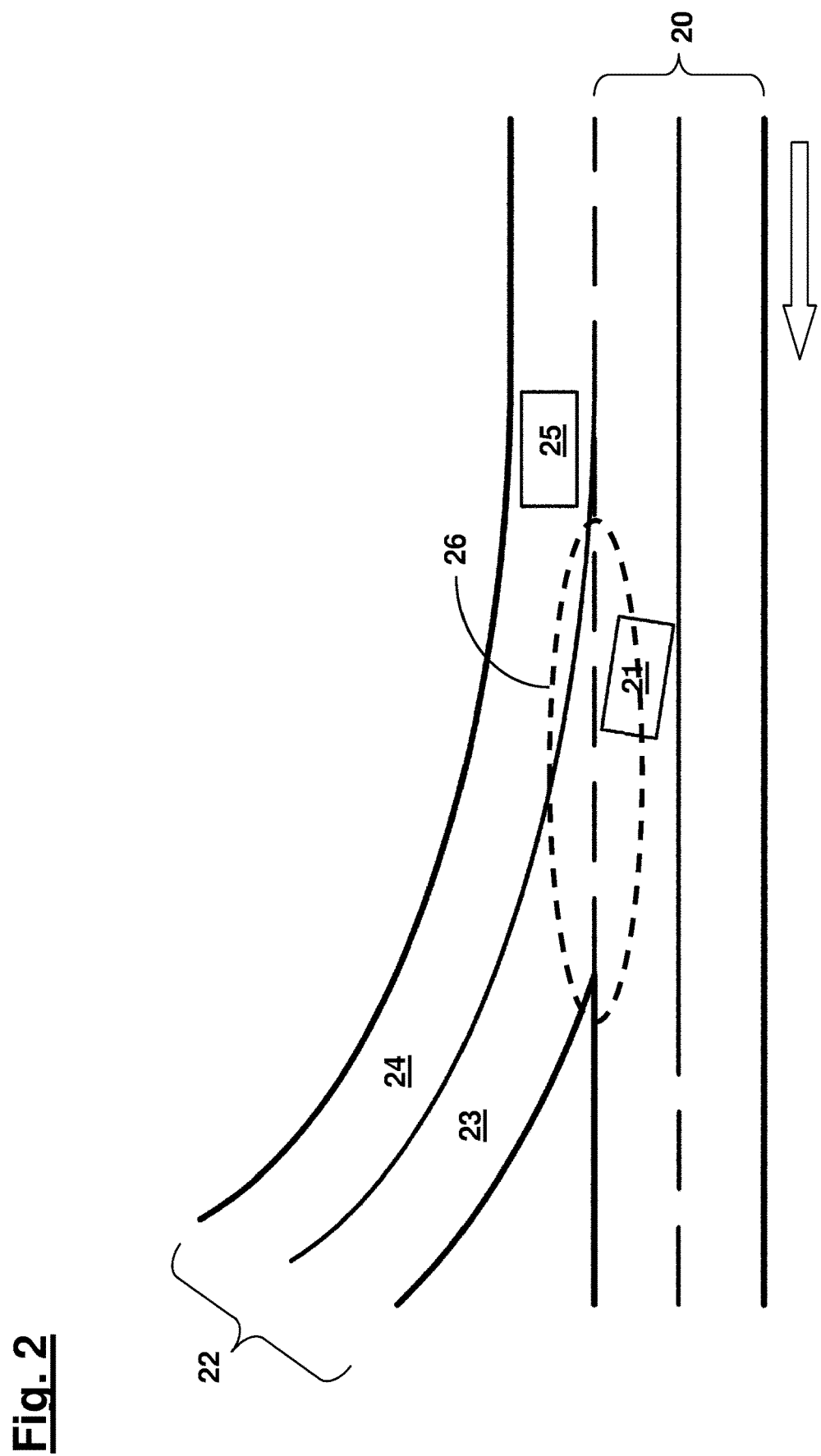

In the drawing:

FIG. 1 shows a block diagram to explain the design and function of a lane change assistance system according to the invention; and FIG. 2 shows a diagram to illustrate a possible scenario of a lane change as an exemplary application of the invention.

According to the block diagram shown in FIG. 1, in an exemplary embodiment a lane change assistance system according to the invention exhibits in a manner known per se a sensor arrangement with radar-based sensors 11 and 12 in the example for detecting the surrounding area to the left or right of the vehicle, and also a front-facing camera 13.

This kind of detection of the surrounding area may also be realized by means of other sensors, such as ultrasound sensors, for example, by means of a rear-view camera, by means of infrared cameras, or by way of car-to-car communication with the help of reports transmitted by other vehicles.

Furthermore, according to FIG. 1 the lane change assistance system in the invention is also designed to detect map data 15 which can be supplied by a navigation system 14, for example, or elsewhere, e.g. by remote access to a cloud storage device, or which can be stored in the lane change assistance system itself.

The lane change assistance system processes the aforementioned map data 15 and determines according to this the lane layout in the vicinity of the vehicle. Furthermore, the position and orientation of the vehicle fitted with the lane change assistance system according to the invention is determined based on GPS and/or compass data or with the help of other positioning systems (e.g. GLONASS, Galileo etc.).

By means of car-to-car communication and/or by means of indicator detection, the lane-changing intentions of other vehicles can also be identified and taken into account when warnings are generated.

In the exemplary scenario depicted schematically in FIG. 2, the driver of a vehicle 21 fitted with a lane change assistance system according to the invention activates the indicator to leave a motorway 20, his intention being to drive along a two-lane slip road 22 joining the motorway exit in the left lane 23. A second vehicle 25 which is detected by a sensor and is in the blind spot is driving in the right-hand lane 24 of the aforementioned two-lane slip road 22, so that based on the map data evaluated as described above and the vehicle positioning data, it is evaluated that the vehicle 21 fitted with the lane change assistance system according to the invention will not be driving in, or crossing, the lane 24 used by the second car 25 in question, although the vehicle 21 crosses an existing lane marking 26 when leaving the road/motorway and it therefore appears this way from a system point of view following a lane change in the direction of the second vehicle 25.

According to the invention, an unnecessary warning signal or an unnecessary steering intervention by the lane change assistance system is therefore suppressed.

If, however, an intention to change lane to the lane being used by the vehicle itself is detected in the case of the second vehicle, whether through car-to-car communication or an indicator being identified on the second vehicle, suppression of the warning signal can again be deactivated.

The result is that in this way unwanted "false activations" of the lane change assistance system are avoided and user comfort is correspondingly enhanced and the driver's confidence in the lane change assistant grows.

The invention claimed is:

1. A method for lane change assistance in a vehicle, the method comprising:
   detecting, by a sensor arrangement, a current surrounding area of the vehicle;
   determining an imminent lane change by the vehicle;
   detecting, by the sensor arrangement, a second vehicle in a an adjacent lane of the vehicle;
   generating, based on the imminent lane change and the second vehicle, a warning signal and/or a steering intervention, the steering intervention inhibiting an ability of the vehicle to perform a lane change into the adjacent lane;
   determine, based on a communication from the second vehicle, an intention of the second vehicle to leave the adjacent lane; and
   suppressing, based on determining the intention of the second vehicle to leave the adjacent lane, generation of the warning signal and/or the steering intervention.

2. The method of claim 1, wherein suppression of the warning signal or of the steering intervention takes place based on a determination that, during the imminent lane change, the vehicle is switching to a lane which forms a newly opening lane which is in addition to a lane along which the second vehicle is driving.

3. The method of claim 2, wherein the newly opening lane is a lane of a road with at least two lanes which branch from a road with multiple lanes.

4. A method for lane change assistance in a vehicle, the method comprising:
   detecting, by a sensor arrangement, a current surrounding area of the vehicle;
   determining an imminent lane change by the vehicle;
   detecting, by the sensor arrangement, a second vehicle in a surrounding area of the vehicle;
   generating, based on the imminent lane change and the second vehicle, a steering intervention, the steering intervention inhibiting an ability of the vehicle to perform a lane change; and
   suppressing, based on map data, generation of the steering intervention.

5. A system comprising:
   a computer processor operable to execute a set of computer-readable instructions; and
   a memory operable to store the set of computer-readable instructions operable to:
   detect, by a sensor arrangement, a current surrounding area of a vehicle;
   determine an imminent lane change by the vehicle;
   detect, by the sensor arrangement, a second vehicle in an adjacent lane of the vehicle;
   generate, based on the imminent lane change and the second vehicle, a warning signal or a steering intervention, the steering intervention inhibiting an ability of the vehicle to perform a lane change into the adjacent lane;
   determine, based on a communication from the second vehicle, an intention of the second vehicle to leave the adjacent lane; and
   suppress, based on determining the intention of the second vehicle to leave the adjacent lane, generation of the warning signal or the steering intervention.

* * * * *